Patented Feb. 6, 1923.

1,444,408

UNITED STATES PATENT OFFICE.

WALTER W. WILLISON, OF BROOKLYN, NEW YORK, ASSIGNOR TO THERMOKEPT PRODUCTS CORPORATION, OF NEW YORK, N. Y., A CORPORATION OF MAINE.

PROCESS OF PREPARING AND PRESERVING COCONUT MEATS AND PRODUCT OBTAINED THEREBY.

No Drawing. Application filed January 11, 1921. Serial No. 436,602.

*To all whom it may concern:*

Be it known that I, WALTER W. WILLISON, a citizen of the United States of America, Brooklyn, in the county of Kings and State of New York, have made a certain new and useful invention in Processes of Preparing and Preserving Coconut Meats and Product Obtained Thereby, of which the following is a specification.

This invention relates to the preparation and preservation of coconut meats, and it is the object of my invention to so treat said nut meats, and to concentrate the milk content of the nut and combine it with the meat, that they will remain in combination in a fresh and sweet condition while maintained in the sealed container wherein it is packed.

In the art of preserving coconut meats, it has heretofore been known that coconut meats can be desiccated and kept for future use, or that they may be shredded and preserved with sugar or other preservative. It has also been proposed to preserve shredded coconut in its original milk. But in the various methods, one or more serious defects develop which cause the coconut meats to loose their delicate flavors, or their crispness, or the color, in part or in whole, so that the preserved article has several marked drawbacks.

I have discovered that by removing the moisture content from fresh coconut meats, under certain conditions, and to a certain extent, and thereafter immediately adding to the partially dried nut meats the fresh sweet coconut milk, and further treating said nut meats, and again removing the moisture content under proper conditions and to a proper extent, I am enabled to keep the so treated nut meats in combination with the concentrated milk content in a proper container, for a very long period of time, in practically their original fresh and desirable condition.

In practicing my invention, fresh coconuts are opened, and the milk is carefully drawn and saved. The nut meat is then removed from the shell, properly freed from all foreign matter and shredded. The shredded meat is then dried under a partial vacuum, or in any suitable drier, wherein evaporation is fairly rapid, and by which the moisture content can be removed to approximately 20% of its original volume. When the shredded nut meat has been sufficiently dried, the original coconut milk, or its equivalent quantity, is added to the semi-dried nut meat. The mass is then thoroughly mixed so that the meat will absorb practically all of the milk. The meat will now be very moist, and it is given sufficient time to thoroughly re-absorb its original volume of moisture content. Thorough mixing at this stage is essential so that all the shreds will have practically the same degree of moisture. After the shredded nut meat has been thoroughly mixed and fully saturated, it is again subjected to the step of removing the moisture content by evaporation or otherwise, and this phase of the process is continued until the moisture content is less than 20%. The shredded nut meat in combination with its concentrated milk content is then sealed in suitable containers under vacuum.

I have found that by my process I am enabled to preserve coconut meats in practically their original fresh condition, and retain good color and flavor. No sterilization is needed to successfully carry out my process, but all operations are carried out under strictly sanitary conditions. A further advantage includes the saving of the coconut milk and its value is retained with the nut meat, and nothing but the milk and nut meat is used in preparing and preserving the article. After treatment, no excess of water is found, and yet the nut meat remains in a soft and pliable condition and retains practically its original color and flavor.

While I have described a specific mode of procedure for carrying out my invention, I do not wish to be understood to have limited myself thereby, as, obviously, the steps may vary without departing from the scope and spirit of my invention.

Having now set forth the objects and nature of my invention, what I claim as new and useful and of my own invention, and desire to secure by Letters Patent, is:

1. The process of preparing and preserving coconut meats in fresh condition, which comprises shredding fresh coconut meats, reducing moisture content, and incorporating with said shredded meats coconut milk to form a product with reduced moisture content.

2. The process of preparing and preserving coconut seats in fresh condition, which comprises shredding fresh coconuts, reducing the moisture content of said shredded nut meat, then incorporating therewith coconut milk to form a pliable product, and again reducing the moisture content of said product.

3. The process of preparing and preserving coconut meats in fresh condition, which comprises shredding fresh coconuts, reducing the moisture content of said shredded nut meat to form a semi-dried product, treating this product in coconut milk to form a moist pliable mass and again reducing the moisture content of said mass.

4. The process of preparing and preserving coconut meats in fresh condition, which comprises shredding fresh coconuts, reducing the moisture content of said shredded nut meat to approximately 20%, then incorporating in said shredded meats the fresh and sweet coconut milk and causing the semi-dried meats to absorb said milk and thereafter eliminating the moisture content to below 20%.

5. The process of preparing and preserving coconut meats in fresh condition, which consists in opening fresh coconuts and saving the milk, shredding the nut meat, and semi-drying the same, then adding the nut milk and causing the semi-dried meat to absorb said milk to form a pliable moist mass, and finally evaporating a major part of the moisture content and packing the product under vacuum.

6. A prepared coconut-meat preserved in fresh condition, comprising semi-dried coconut meat having incorporated therein coconut milk.

7. A prepared coconut meat preserved in fresh condition, comprising shredded semi-dried coconut meat having incorporated therein its milk in concentrated form.

8. A prepared and preserved coconut product, comprising fresh comminuted coconut meat having incorporated therein its original milk, the whole being deprived of the major part of its original moisture content.

9. The process of preparing and preserving coconut meats in fresh condition, which comprises shredding fresh coconuts, reducing the moisture content of said shredded nut meat, then incorporating therewith coconut milk to form a pliable product, and again reducing the moisture content of said product, and sealing the said product in vacuo.

10. A prepared coconut meat preserved in fresh condition, comprising shredded semi-dried coconut meat having incorporated therein its milk in concentrated form, and being preserved in vacuo.

In testimony whereof I have hereunto set my hand on this 7" day of January A. D., 1921.

WALTER W. WILLISON.